US012570055B2

(12) United States Patent
Spooner et al.

(10) Patent No.: US 12,570,055 B2
(45) Date of Patent: Mar. 10, 2026

(54) CHEMICAL BONDING AND TOOL THEREFORE

(71) Applicant: QinetiQ Limited, Farnborough (GB)

(72) Inventors: Christopher Douglas James Spooner, Bracknell (GB); Lyn David Jones, Fleet (GB); Lloyd Morris Wye, Farnborough (GB); Robert Nathan Williams, Farnborough (GB)

(73) Assignee: QinetiQ Limited, Farnborough (GB)

( * ) Notice: Subject to any disclaimer, the term of this patent is extended or adjusted under 35 U.S.C. 154(b) by 215 days.

(21) Appl. No.: 18/274,132

(22) PCT Filed: Jan. 20, 2022

(86) PCT No.: PCT/EP2022/051165
§ 371 (c)(1),
(2) Date: Jul. 25, 2023

(87) PCT Pub. No.: WO2022/161833
PCT Pub. Date: Aug. 4, 2022

(65) Prior Publication Data
US 2024/0424747 A1    Dec. 26, 2024

(30) Foreign Application Priority Data
Jan. 28, 2021    (GB) ..................................... 2101157

(51) Int. Cl.
*B29C 65/00*        (2006.01)
*B29C 65/02*        (2006.01)
(Continued)

(52) U.S. Cl.
CPC .......... *B29C 66/8145* (2013.01); *B29C 65/02* (2013.01); *B29C 66/71* (2013.01);
(Continued)

(58) Field of Classification Search
CPC ............................ B29C 66/8145; B29C 65/02
See application file for complete search history.

(56) References Cited

U.S. PATENT DOCUMENTS 5,603,871 A      2/1997  Koseko et al.

FOREIGN PATENT DOCUMENTS

EP            1562735        8/2005
EP            3702122        9/2020

OTHER PUBLICATIONS

Intellectual Property Office, Search Report mailed Nov. 2, 2021, issued in connection United Kingdom Patent Application No. GB2101157.2, 4 pages.
(Continued)

*Primary Examiner* — Nicholas Krasnow
(74) *Attorney, Agent, or Firm* — McDonnell Boehnen Hulbert & Berghoff LLP

(57) ABSTRACT

A method of forming a shaped article wherein said article comprises at least two parts which are chemically bonded, the method comprising: assembling at least two non chemically bonded parts in a weld cavity of a tool to form an assembly of the at least two parts, wherein said weld cavity is adapted to receive the assembly of at least two parts in the form of the shaped article; sealing the weld cavity of the tool; melting the assembly of at least two parts to chemically bond the at least two parts together to form the shaped article, wherein the shape of the weld cavity is matched to the outer circumference of the assembly of parts such that thermal expansion forces the polymer parts against the weld cavity surface and the pressure leads to full surface bonds between all parts, and wherein the tool forming the weld cavity comprises two halves forming a piston which fits into the bore of a bolster component and the plane of the split line between the two piston halves is parallel to the axis of the bore such that the pressure from the thermal expansion of the
(Continued)

assembly of parts within the weld cavity is opposed by the surface of the bore preventing the weld cavity split line from opening and therefore preventing leakage of polymer from within the pressurised weld cavity volume, and wherein the two piston components are made from a dissimilar metal with higher coefficient of thermal expansion than the bolster component ensuring that at the welding temperature the piston is larger in diameter than the bore diameter of the bolster component leading to an interference fit which makes forces the weld cavity split line to close at the weld temperature but which still allows for a clearance gap between piston and bore at room temperature for the tool to be assembled and disassembled.

22 Claims, 3 Drawing Sheets

(51) Int. Cl.
    *B29K 23/00*        (2006.01)
    *B29K 105/16*      (2006.01)
    *B29K 709/00*      (2006.01)
    *B29L 11/00*        (2006.01)

(52) U.S. Cl.
    CPC .... *B29C 66/81261* (2013.01); *B29C 66/8322* (2013.01); *B29C 66/876* (2013.01); *B29K 2023/065* (2013.01); *B29K 2105/16* (2013.01); *B29K 2709/00* (2013.01); *B29K 2905/00* (2013.01); *B29L 2011/0016* (2013.01)

(56) References Cited

OTHER PUBLICATIONS

International Searching Authority, International Search Report and Written Opinion, mailed Apr. 26, 2022, Issued in connection with International Patent Application No. PCT/EP2022/051165, filed Jan. 20, 2022, 13 pages.

CHEMICAL BONDING AND TOOL THEREFORE

The present application is a national stage entry of PCT/EP2022/051165 filed on Jan. 20, 2022, which claims priority to Great Britain Patent Application No. 2101157.2 filed Jan. 28, 2021, the contents of each of which are hereby incorporated by reference.

FIELD OF THE INVENTION

The present invention relates to methods of welding parts together to form a shaped article. More particularly, the present invention relates to a method of welding thermoplastic polymer parts together to form a shaped multilayer article. Examples include any thermoplastic product requiring thick second parts and/or multi-layered structure, for example for use in the injection moulding industry, car industry, medical industry and aerospace.

BACKGROUND OF THE INVENTION

The assembly of parts to form a complex shaped article or product presents a number of challenges particularly when a high level of precision is involved and/or it is required to maintain desired properties at the interface between parts and in the main body thereof. Such a level of precision may be required in preparing so called Radio Frequency (RF) products. RF products are generally taken to mean devices or products which operate in the radio wave region of the electromagnetic spectrum, with wavelengths longer than infrared light. They have frequencies from about 3 kHz to about 300 GHz, and corresponding free space wavelengths from about 100 km to about 1 mm. More recently, the terahertz frequency domain is being used. Terahertz is typically defined as the frequency range of 100 GHz to 30 THz with corresponding free space wavelengths of 3 mm to 0.01 mm. Particular types of lens may also operate within this range of the spectrum. Examples of RF products include multilayer products such as radomes, RF lenses (e.g. a Luneburg lens), retro-reflectors, RF waveguides, RF filters, RF resonators, metamaterial structures, refraction structures, diffraction structures, or scattering structures.

Certain applications may require the various layers forming the products or lenses to possess different material properties, e.g. being able to control the permittivity is desirable for many RF products. The product or article may therefore comprise a number of layers of varying chemical constitution and/or shape which must be made separately. The parts may be complex in shape, e.g. comprising parts of constantly varying section thickness and/or doubly curved surfaces, and a low cost manufacturing process may be required to manufacture the product in large volume and economically and, at the same time, retain a good quality bond between the layers which does not deleteriously affect the material properties of the product.

Injection moulding is a low cost scalable technique for making the various parts of a product such as a lens. However, the parts, which may be made from injection moulding, are limited in section thickness mainly due to the thermal conductivity of polymers and the shrinkage of thermoplastic polymers on solidification and cooling from the melt processing temperature back down to room temperature.

The various parts will therefore require to be chemically bonded and preferably over the whole surface area of the sections representing the interface(s) between different parts. By forming a good chemical bond across the entire interface, certain performance aspects of the part, such as mechanical properties or function, may be improved. The presence of unwanted or unexpected air voids in an RF product, for example, would be expected to adversely affect electrical performance. In addition, degradation of such a product which is not whole surface bonded will occur over time, resulting in the separation of adjoining layers or gas (typically air) and/or moisture ingress into any voids which may be present.

Injection moulded parts are typically assembled to form a shaped article or product by polymer welding techniques such as ultrasonic welding or vibrational welding. In these techniques, energy is directed to the bondline by frictional heating under a clamping force which melts a thin interfacial layer of the part or parts which are typically made from thermoplastic polymers. This allows the polymer to flow and polymer chains of the different parts at the interface to form a chemical bond of high strength. However, it is difficult to provide whole surface bonds using these techniques, i.e. a bond which covers the entire area of the interface formed between different parts. Both ultrasonic welding and vibrational welding require energy intensifier features to be designed into the initial part moulding. These intensifiers melt and flow during welding which can lead to difficulties controlling geometrical tolerances of the interface between the layers and may lead to voids, un-bonded areas and flash if the flow is not carefully controlled. Furthermore, multi-layer complex shaped geometries for functional products such as lenses are not always suitable for use in connection with these techniques and cannot easily be re-designed to accommodate such assembly processes without affecting the function of the part. For example, some parts for use in a lens are too thin for ultrasonic welding, the instant energy of which would damage the part, are the wrong shape to allow energy dispersion in an even manner, are too thick to allow transmission of the energy through the part to the bondline, or are made from soft polymers such as polyolefins which may dampen the energy.

A vibration technique known as spin welding is ideal for radially symmetric parts such as lenses but requires chuck features (e.g. holes or protrusions) to grip the parts to allow one part to be rotated relative to the other and these can disrupt the design geometry of the product and limit the number of layers which can be bonded (leaving holes or protrusions which affect the bondline of the next layer). Laser welding, which requires a transparent surface to be bonded to an absorbing surface, is not possible when seeking to bond parts comprising opaque and/or functional fillers. The presence of functional fillers also increases the melt viscosity and therefore makes it difficult to facilitate adequate material flow in the bondline to provide good adhesive strength.

Over-moulding and/or multi-shot moulding are other known techniques for assembling injection moulded parts. In these techniques, each new layer is injection moulded over the previous moulded layer in a progressively larger mould cavity. These techniques have a number of disadvantages. Moulding a molten polymer over a solidified part of a similar polymer will cause the first part to partially melt. This may deform the geometry at the interface between the two parts, particularly opposite the gate of the injection moulding tool where pressures and temperatures are highest. Polymers of progressively reducing melt temperatures can be used but this limits the number of layers possible. This problem is exacerbated when functional, environmental, or mechanical requirements limit the available polymer choices for use in a functional device. There may not be a sufficient range of polymer families available to meet the desired requirements. This represents a challenge of particular significance for RF products such as lenses, when polymers with low loss tangents are often required to minimise energy loss or absorption of RF energy propagating through the structure. Often, very few polymers are available commercially which meet the low loss requirements. Further, mechanical locking features typically need to be designed into the interface layer of the solidified part(s) to ensure they remain connected during service and these features can disrupt the geometry of the functional product. The tooling required for over-moulding and multi-shot moulding techniques tends to be more complex, difficult to design and expensive than conventional single-shot injection mould tooling. The manufacture of articles by multi-shot moulding is regarded as a specialist process often requiring bespoke equipment for one product design and its use represents a significant barrier to market entry for a given product. It is difficult to compensate for shrinkage with multi-shot moulding and this leads to further difficulties in compensating for shrinkage to control geometry of the final shaped article or product.

Shrinkage can also lead to residual stresses and warpage. In multi-shot tools, the ability to mould more than one identical part in a single machine cycle is limited when compared to single shot moulding. This limits the economies of scale possible.

SUMMARY OF THE INVENTION

The present invention seeks to address the above-mentioned problems along with providing a number of improvements. In one aspect the present invention provides a method of forming a shaped article wherein said article comprises at least two parts which are chemically bonded, the method comprising:

assembling at least two non chemically bonded parts in a cavity of a tool (the weld cavity) to form an assembly of the at least two parts, wherein said weld cavity is adapted to receive the assembly of at least two parts in the form of the shaped article;

sealing the weld cavity of the tool;

melting the assembly of at least two parts to chemically bond the at least two parts together to form the shaped article, wherein the weld cavity is matched to the outer circumference of the assembly of parts so that thermal expansion forces the polymer parts against the weld cavity surface and the pressure leads to full surfaces bonds between all parts, and wherein the weld cavity comprises two halves of a piston which fit into the bore of a bolster component and the plane of the split line between the two halves is parallel to the axis of the bore such that the pressure from the thermal expansion forces of the polymer parts acts against the surface of the bore preventing the weld cavity split line from opening and therefore preventing leakage of polymer from within the pressurised weld cavity volume, and wherein the two piston components are made from a dissimilar metal with higher coefficient of thermal expansion than the bolster component ensuring that at the welding temperature the piston is larger in diameter than the bore diameter of the bolster component leading to an interference fit which makes it impossible for the weld cavity split line to open and the weld cavity to leak but which still allows for a clearance between piston and bore at room temperature for the tool to be assembled and disassembled.

In one embodiment the piston and bore faces are parallel to the axis of the bore. However, it has been found by the inventors that the tight tolerance required to obtain a clearance fit between piston and bore at room temperature to allow the tool to be assembled and an interference fit at the welding temperature to ensure the weld cavity cannot leak at the split-line required precision machining; increasing the cost of tool manufacture. The tool was also difficult to assemble (both manually and robotically) containing no lead-in features to align piston to bore as the tool is assembled. The tight tolerance and deep stroke required of the piston and bore also lead to premature wear on the softer aluminium components; reducing tool life.

In one embodiment the piston and bore faces are angled relative to the axis of the bore at an angle of 1.5 degrees or greater resulting in a cone shaped piston and bore giving rise to a draft angle which ensures a clearance gap is realised almost immediately as the piston is retracted out of the bore making it easier to assemble and disassemble the tool and reducing tool wear.

In one embodiment there is a gap between the base of the piston components and the base of the bore when the tool is assembled so the only critical dimensional tolerances are the piston split line faces and the angle of piston and bore surfaces relative to the bore axis to significantly reduce cost of manufacturing the tool.

In one embodiment there is a cone angle of 16.5 degrees or greater of the piston and bore faces relative to the axis of the bore and a top cap threaded into a thread in the bolster component at the top of the bore to ensure a self-releasing fit between piston and bore to further aid assembly and disassembly and further reduce tool wear in a production environment.

By chemically bonded is meant the at least two parts may be bonded by covalent or molecular bonds. The chemical bonding may comprise or consist of covalent or molecular bonds.

By sealing the weld cavity of the tool any potential leakage from the tool is minimised or prevented. In the various aspects of the invention, the shaped article comprises an assembly of the at least two parts which are chemically bonded. The at least two parts may be melted by the application of heat. The at least two parts may be heated to what is referred to herein as the welding temperature. The shaped article is cooled following chemical bonding of the least two parts. This may be done by leaving the tool and/or shaped article at room temperature and allowing it to cool naturally or it may be exposed to a temperature at less than room temperature in order to speed up cooling.

Typically, the weld cavity is shaped to match the outer surface profile of the assembly of at least two parts. The weld cavity may be scaled to be larger than the volume of the assembly of at least two parts at room temperature (for example at about 20° C.) in order to allow for some expansion of the assembly during its transformation into the final shaped article during heating. For example, the weld cavity may be scaled to be larger in volume than the assembly of the at least two parts at room temperature (e.g. about 20° C.) by about 0.5-6 vol % or about 0.5-3 vol % or about 1-2 vol %.

Advantageously, the at least two non chemically bonded parts are assembled to form an interface between the at least two parts and, following melting, a chemical bond is formed across the entire interface or substantially the entire interface. The percentage of the area of the interface which is bonded may be at least about 90% and up to about 100%. For example, the percentage of the area which is bonded may be at least 92% or at least 98%. The percentage of the area of the interface which is bonded may be up to about 98% or 99%. Pressure may be applied to the assembly of the at least two parts during formation of the chemically bonded shaped article.

Essentially, the tool is provided in more than one part to enable access to the weld cavity and for the at least two non chemically bonded parts to be assembled in the weld cavity and subsequently removed.

The at least two chemically bonded parts may each possess different material properties. For example, each part may possess a different permittivity, density, magnetic permeability, conductivity, antimicrobial, catalytic, modulus or colour. The value of the permittivity of the material properties of different parts may be controlled by varying, independently of each other, one or any combination of polymer, filler and relative amounts thereof.

The at least two parts are typically thermoplastic or at least one of the parts is thermoplastic. The at least two parts may be (thermoplastic) polymer comprising a filler material. Examples of suitable polymer are selected from:

polyethylene (PE), polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU).

Polyethylene has been shown to provide particularly good results using this technique and in accordance with the present invention. Polyethylene may be selected from low density polyethylene (LDPE) or linear low density polyethylene (LLDPE) or high density polyethylene (HDPE). LDPE typically possesses a density of 0.917-0.930 g/cm³. LLDPE differs structurally from LDPE due to the absence of long chain branching. HDPE has extremely low levels of chain branching allowing it to solidify with high levels of crystallinity and it typically possesses a density of 0.94-0.96 g/cm³.

The at least two parts, e.g. at least two polymers may comprise a filler or filler material. The amount of filler may be present in an amount of 0 vol % to 60 vol %, preferably 0 vol % to 30 vol %. The amount of filler may be present in an amount of at least 0.5 vol %. The amount of filler or filler material is calculated from the mass ratio of the constituent components in the mixture and the bulk density of the materials. The filler may be selected from ceramics, minerals, metals, metal compounds, polymers, and natural materials such as wood. The filler may be particulate (e.g. spherical, faceted, or platelet) or fibrous in shape.

The at least two parts may be in the form of layers, e.g. polymer layers or filled polymer layers. Any number of the parts may be curved, e.g. doubly curved. By a doubly curved surface is meant a surface which has its radius in simultaneously two planes. Spheres and hemispheres are examples of doubly-curved surfaces. All of the layers in the shaped article may be curved, e.g. doubly curved. Each of the layers may possess different material properties, such as permittivity.

The shaped article may be a functional product filled with various filler constituents to allow it to carry out a function, such as electrically conductive fillers to act as an electrical conductor, magnetic fillers to provide magnetic permeability, or dielectric fillers to influence RF energy for an RF product. For example, the shaped article may be a lens, e.g. a multilayer lens, e.g. a beam forming lens, e.g. a Luneburg lens. The lens may comprise or consist of curved layers. At least one, or any combination, of the layers may be doubly curved. Each of the layers may possess a different permittivity or permeability.

BRIEF DESCRIPTION OF THE DRAWINGS

This and other aspects of the present invention will now be described in more detail, with reference to the appended drawing(s) showing embodiments(s) of the invention.

DETAILED DESCRIPTION OF THE INVENTION

Figure 1:
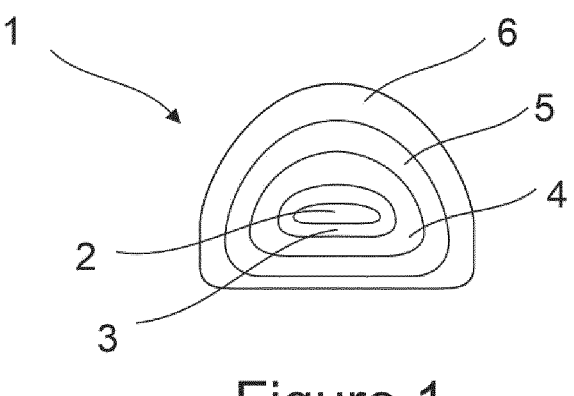
FIG. 1 shows a cross section of the assembly of parts made up of 5 separate parts which may each need to be further sub-divided into two or more parts to allow each part to be moulded.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout. The cavity into which the assembly of parts is contained in during welding or tool cavity is referred to as the weld cavity.

Though the present application may tend to focus on the construction of multi-layered (RF) lens structures it will be appreciated that the techniques described herein are applicable to any multi-layered/multi-part assembly comprising (thermoplastic) parts and particularly complex shaped articles which would be difficult to manufacture by alternative means.

The methods in accordance with the present invention may be suitable for use in a broad range of applications including making: electronic or electromechanical sensors, actuators, solenoids, motors, acoustic sound dampening claddings and mounts, multi-material enclosures, power tool components and pharmaceutical components such as prosthetics, implants, drug delivery systems, applicators and catheters.

The methods in accordance with the present invention may be suitable for use in RF applications such as making: RF lenses (e.g. a Luneburg lens), retro-reflectors, RF wave-guides, RF filters, RF resonators, metamaterial structures, refraction structures, diffraction structures, or scattering structures.

The tool for use in accordance with the present invention may be subjected to certain design parameters for controlling the balance of conditions within the weld cavity. The tool typically provides a sealed pressurised environment. Pressure serves to eliminate or reduce any gaps between parts in the assembly resulting from geometrical tolerances of the manufacturing process from which the parts were made and hence eliminate or reduce any gaps in the shaped article which is formed in accordance with the present invention. Pressure also serves to provide sufficient force to bring the parts into intimate contact and provide high strength chemical bonds. Preferably, material flow is reduced or even more preferably eliminated to preserve the geometry of the parts being welded and to control the geometry of the interfaces in the final shaped article which may be referred to herein as the welded assembly which is, after the welding process, one single object which can no longer be separated into its constituent parts. The assembly of non bonded parts before the welding process is performed is referred to herein as the assembly of parts.

The present inventors have found that optimum results may be achieved by using a welding temperature which is within ±5° C. of the melting temperature of the at least two parts. If parts are used of different materials (e.g. different polymers), then the melting point of the material possessing the highest melting point is used as the welding temperature (or a higher temperature). The temperature may be mini-mised to minimise expansion but should be high enough to adequately soften the parts to allow part interfaces to move together in an interference fit and, for the case when poly-mers are used, polymer chains to form the required chemical bond.

At the optimum weld temperature, the weld cavity may be scaled (typically uniformly in x, y and z directions) so as to be larger in volume than the room temperature volume of the assembly of parts. This is to prevent excessive pressure and leakage out of the weld cavity due to thermal expansion of the assembly of parts at the weld temperature but also allows for a clearance so that the shaped article can be easily inserted into the weld cavity before welding and to shrink back from the weld cavity wall during cooling and re-solidification, releasing the shaped article cleanly from the walls of the weld cavity (eliminating flash contamination on the surface of the tool which would need to be cleaned before subsequent welding of another part) and allowing clearance for easy removal of the welded assembly from the weld cavity. Scaling ratios by a volume of about 0.5-6% are preferred, more preferably about 0.5-3%, even more pref-erably about 1-2%. These scaling ratios are suitable for use with parts made from Low Density Polyethylene (LDPE), Medium Density Polyethylene (MDPE), Linear Low Den-sity Polyethylene (LLDPE), High Density Polyethylene (HDPE) and Polypropylene (PP). The optimum ratio may depend on the thermal expansion of the constituent parts (e.g. polymer), volume % loading of filler, thermal expan-sion of the filler material and the geometry of the part(s), the thermal expansion coefficient of the tool materials and the welding temperature (range).

The volume of the parts can be readily calculated from measurement of the part masses if the density of the mate-rials used to make the parts (e.g. polymers) is known. The expansion rate of the materials may be measured using techniques such as thermal mechanical analysis.

When the welded assembly (i.e. the shaped article) is to be cooled, typically the outer surface temperature of the welded assembly will drop below the glass transition tem-perature, below the heat deflection temperature, or below the Vicat softening temperature before the welded assembly can be removed. To some extent this will be dependent on the nature of the (polymer) materials and the geometry of the welded assembly (or shaped article).

The heating time may be reduced by the use of any of inductive tool heating, contacting opposite surfaces (e.g. top and bottom) of the tool to heated elements, e.g. platens, heating the tool to a temperature higher than the weld temperature which will increase the rate of heat flow, or by using fluid channels within the tooling to allow for the use of Rapid Isolation Cooling and Heating (RICH) tooling (which typically uses circulating fluid, or pressurised steam to quickly heat the tool and subsequently rapidly cool the tool), or by inserting pre-heated parts into pre-heated tools.

Welding time can be considered to be instantaneous once the heat has been conducted through the entire volume of the assembly of parts via the surface of the weld cavity through to the centre of the assembly of parts, such that the entire volume of the assembly of parts is at or above the required weld temperature. In reality, the welding process takes a finite time but this time is so much smaller than the required time for heat conduction so as to be considered instanta-neous.

Reduced cooling time can be achieved by moving the tool to a refrigerated environment once the weld cycle is com-plete, immersing the tool in a cooling fluid, or via the use of RICH tooling. RICH tooling can significantly decrease cycle time by reducing pressure in the steam during the cooling cycle allowing it to evaporate and removing heat energy from the surface of the cooling channels by the latent heat of evaporation (at the expense of the energy required to provide the rapid changes in temperature). RICH tooling has been developed by Yudo and is marketed in Europe by Cinpres.

Both the heating and cooling time can be reduced by designing the shaped article with a (central) cored hole through which a metal pin protruding from the weld cavity can be inserted during assembly of the tool and arranging the assembled parts. As the thermal conductivity of metals is significantly higher than that of polymers, this allows heat flow in from the centre of the assembly as well as the circumference and effectively reduces the distance over which the heat flows through a low thermal conductivity polymer.

To reduce manufacturing cost and facilitate the method being scalable to high volume manufacture (with, for example, many assemblies per minute being welded) then robotic assembly/disassembly of parts and tools may be used. Advantageously, the tool design concepts described herein are amenable to robotic manipulation. Conveyorised continuous ovens or paternoster ovens or RICH cooling may be used to allow high throughput. The method in accordance with the present invention is suitable for use in preparing shaped articles of any architecture and/or geometry.

A paternoster oven provides advantages in that each shelf can be designed with an integral clamping mechanism to provide tool closure forces for a stack of one or more tools. This oven may have a heating phase during raising of the stack of tools, followed by a cooling phase during the descent of the stack of tools.

The method in accordance with the present invention has a number of advantages in connection with the assembly of multi-part, complex shaped articles. All voids from mismatched part tolerances are eliminated or reduced during the welding process, meaning part tolerances can be relaxed, thus further reducing manufacturing costs. The method is insensitive to the number of parts and the architecture of the assembly or shaped article. This means equipment and factory lines do not need to specialise on one single product design (as is the case for example with multi-shot moulding and to a lesser extent other polymer welding techniques). This is helpful to reduce capital expenditure for multiple product lines or new product launches. Geometrical tolerances are also well controlled with features such as energy intensifiers (required in ultrasonic and vibration welding techniques) not being required to be moulded into the parts to facilitate successful welding. The method in accordance with the present invention also allows for whole surface chemical bonds between parts which is difficult to achieve with other polymer welding techniques.

The method in accordance with the present invention is applicable to any assembly of thermoplastic parts in a range of industries where conventional polymer welding techniques, over-moulding, multi-shot moulding, or chemical adhesive bonding is found to have limitations. In particular, the method is well suited to thick assemblies, or assemblies of many parts which would otherwise require many assembly steps and multiple pieces of bespoke equipment and tooling. Another advantage of the present invention for thick assemblies is that the slow cooling rate, inherent in the process, leads to thorough annealing and growth of crystallites (in semi-crystalline polymers), giving rise to a reduction in residual stress and potential for changes in geometry and warpage in high service temperature environments.

The method in accordance with the present invention is well suited for use with functional polymer parts, which might be heavily loaded with any one or more of a range of filler materials including those which provide one or more of the following functions: dielectric, magnetic, conductive, antimicrobial, catalytic, high/low density as required, antimicrobial, catalytic, high/low modulus as required, or colour. Such heavily filled polymers would be difficult to weld using conventional polymer welding techniques.

The method in accordance with the present invention is also well suited for preparing complex, irregular and/or doubly curved shapes of varying section thickness which can be difficult to weld using conventional welding techniques. The shaped articles formed in accordance with the method of the invention may be suitable for use in a broad range of applications including in making: electronic or electromechanical sensors, actuators, solenoids, motors, acoustic sound dampening claddings and mounts, multimaterial enclosures, power tool components and pharmaceutical components such as prosthetics, implants, drug delivery systems, applicators and catheters.

The methods in accordance with the present invention may be suitable for use in RF applications such as making: RF lenses (e.g. a Luneburg lens), retro-reflectors, RF waveguides, RF filters, RF resonators, metamaterial structures, refraction structures, diffraction structures, or scattering structures.

The tool for use in connection with the method of the present invention is preferably constructed of two parts with a split line to allow for opening and insertion of constituent parts and removal from the cavity of the shaped article. The split line may be in a form so it does not act as a leak path for molten material from the assembly of parts out of the tool cavity. A parallel faced butt joint may be used to eliminate leakage. The tool for use in connection with the method of the present invention may be constructed of more than two parts.

The preferred approach to seal the tool split line in accordance with the present invention is to extend the one part of the tool to give a bore. The other part of the tool may then form a piston which fits into the extended bore (for example an overlap of about 25 mm has been found to be adequate.) The material of the piston part of the tool is preferably chosen to have a higher thermal expansion than the material of the bore part of the tool. Preferably, aluminium is used for the piston and steel for the bore. At the weld temperature, the piston thus expands to close the gap between the two tool parts (or halves) and provides an interference seal which has been found to resist leakage from exceptionally high internal weld cavity pressures. The softer material of the piston parts may be surface treated to ensure its surface hardness is similar to the harder material to prevent wear and damage to the piston/bore and extend the life of the tool. For example, aluminium pistons may be hard anodized. By using different materials, increased weld cavity pressures are obtainable resulting in improved bond strengths. Thermal expansion forces from the assembly of parts (which can act to open the tool) are easier to resist with this tool design leading to elimination of leakage of liquid polymer from the assembly of parts from the weld cavity at the weld temperature which is a preferred outcome according to the present invention in order to control the geometry of the welded assembly.

Figure 2:
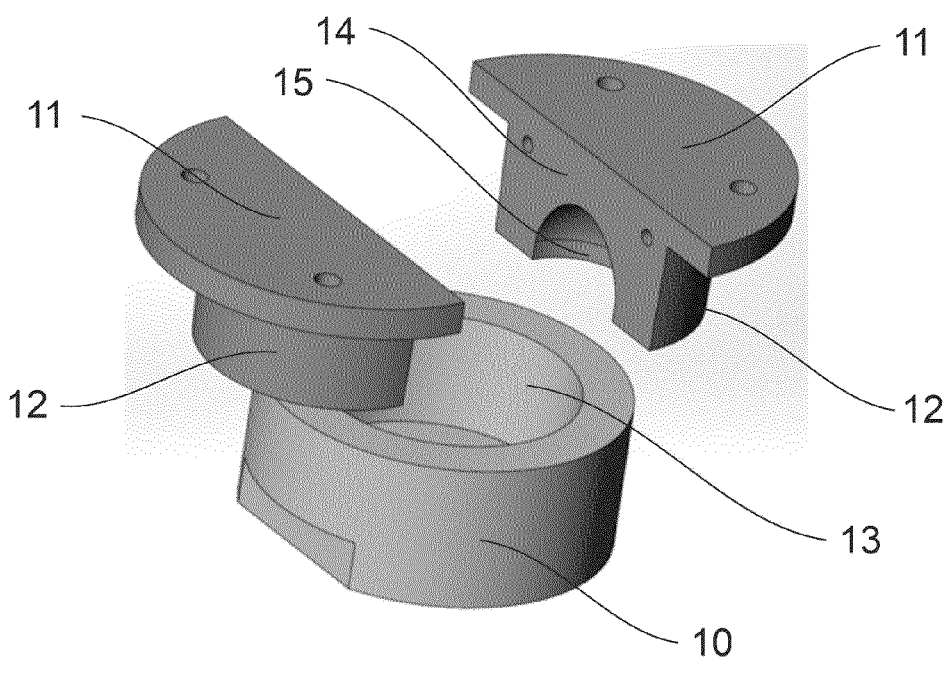
FIG. 2 shows an exploded diagram of the different tool components of a piston/bore tool design.
Figure 3:
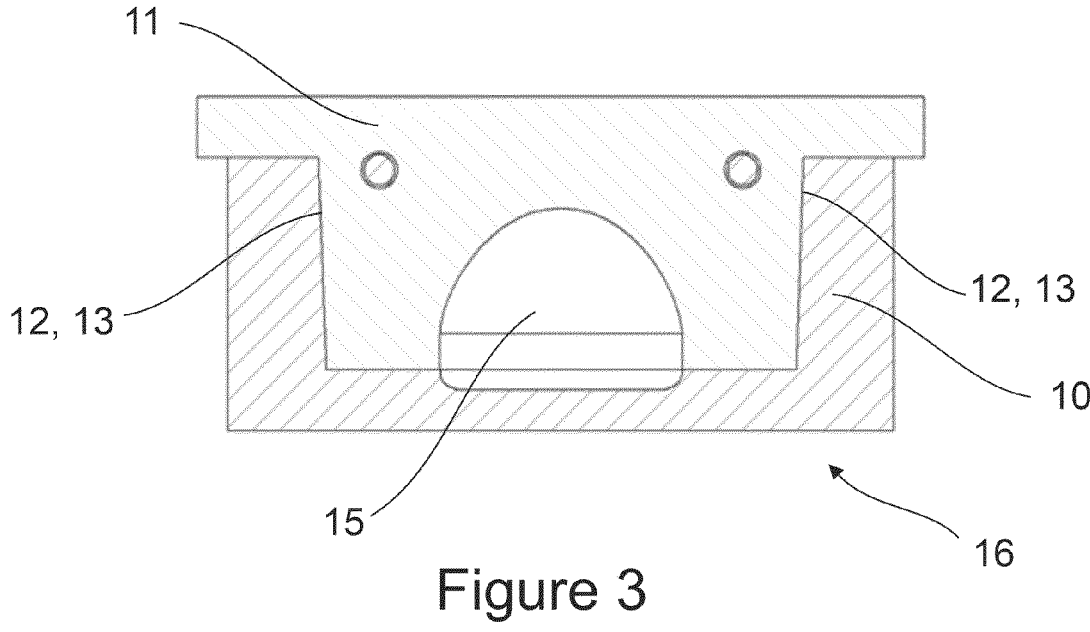
FIG. 3 shows a cross section of the piston/bore tool assembly

FIG. 2 and FIG. 3 show an extension of the dissimilar material piston/bore tool design which has been found by the inventors to resist weld cavity leakage and provide reliable whole surface bond strength and good control of geometry by elimination of weld cavity leakage. The cavity part of the tool (11) is a piston (12) which is inserted into the bore (13) of the bolster of the tool (10). The cavity part of the tool (11) is split in half along the centreline giving a weld cavity split line (14) which is parallel to the axis of the bore surface (13) of the bolster (10). The assembly of parts shown in FIG. 1 (1) fits into the weld cavity (15) formed when the core pistons are inserted fully into the bore of the bolster resulting in the assembled weld tool assembly shown in FIG. 3 (16). The two core parts of the tool shown in this example in FIG. 2 and FIG. 3 (11) are machined from aluminium with a H6 piston tolerance (+0 to −22 microns diameter). The bolster component (10) in this example is machined from steel with a G7 bore tolerance (+12 to +47 microns diameter). The coefficient of thermal expansion for aluminium is greater than that of steel. At the weld temperature the piston components are designed to be larger than the bore diameter of the bolster in this way an interference fit is generated between the piston surfaces (12) and bore surface (13) closing the assembly gap between the two piston components (11) at the split line (14). Furthermore the split line between the two core halves (14) is parallel to the axis of the bore and so thermal expansion forces from the assembly of parts acts against the bore surface (13) and prevents the split line from opening which would result in leakage of liquid polymer from the weld cavity. Although this tool design has been demonstrated over many weld cycles with piston and bore faces parallel to the bore axis, a 1.5 degree draft angle is recommended between piston/bore faces and the bore axis such that the diameter of the piston/bore at the base of the bore is smaller than at the top of the bore. This allows for piston and bore faces to give an immediate clearance gap as the piston is removed from the bore making the tool easier to assemble and reducing wear on the piston and bore faces.

Figure 4:
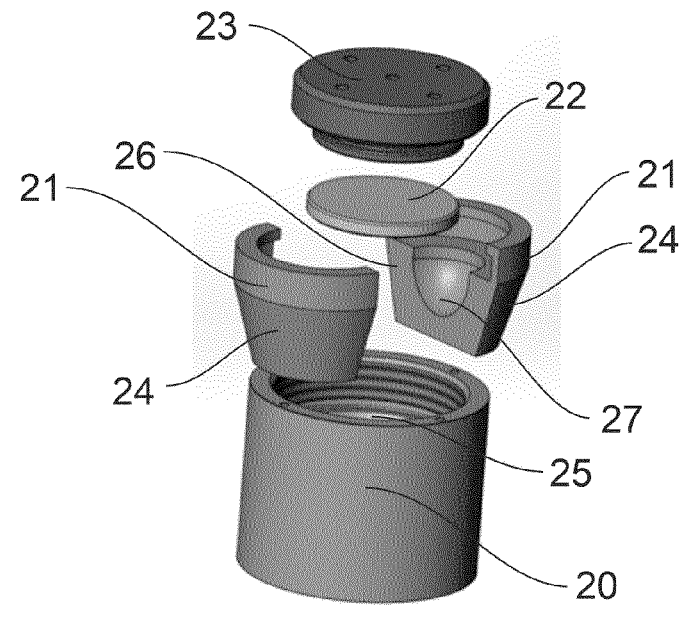
FIG. 4 shows an exploded diagram of the different tool components of the 16.5 degree self-releasing tool design.
Figure 5:
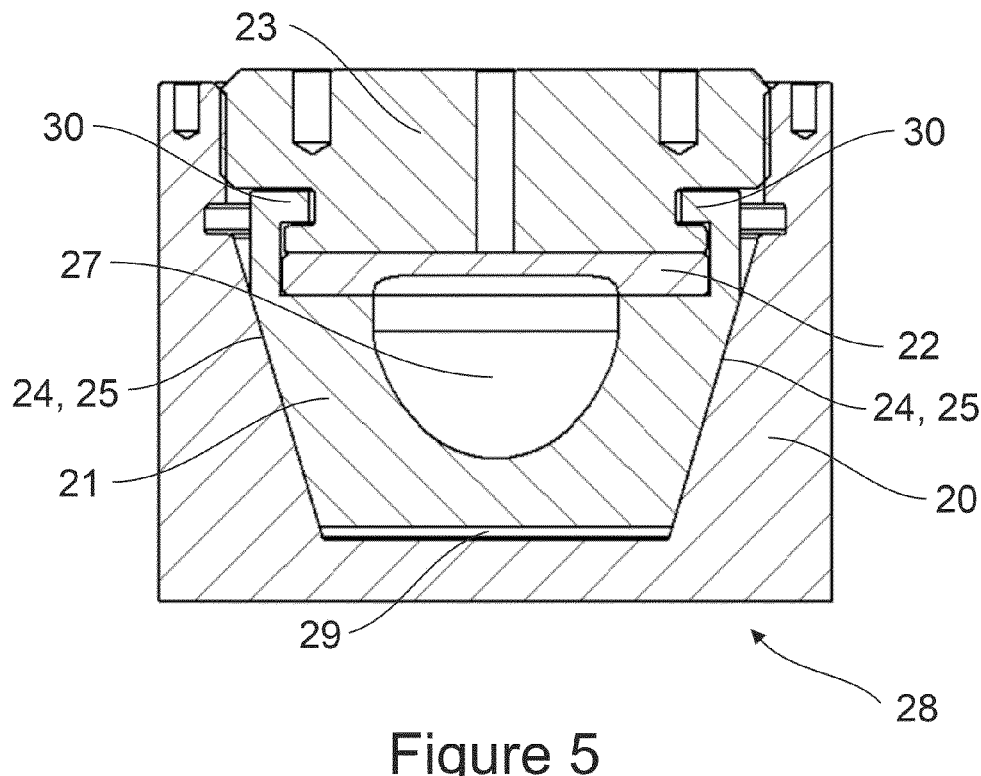
FIG. 5 shows a cross section of the 16.5 degree self-releasing tool assembly

FIG. 4 and FIG. 5 show an extension of the piston/bore tool design whereby the angle between the piston (24) and bore (25) faces relative to the axis of the bore is increase to 16.5 degrees or more to give a 16.5 degree self-releasing design. The 1.5 degree angle recommended for the piston/bore design described in FIG. 2 and FIG. 3 is a self-locking angle. The coefficient of friction between metal surfaces of piston and bore at the weld temperature is expected to lock the two faces in position due to the interference fit and prevent the piston components (11) from sliding out of the bolster (10). A similar angle is employed in machine tool bits using a Morse Taper to secure the rotating tool bit securely in the chuck during machining operations. The required H6 piston and G7 bore tolerances required for this design are costly to machine and due to the high cycle time of the present invention, many tools are required to provide adequate production rate. The 16.5 self-releasing design was developed make the piston/bore tool design more economical to machine and also improve ease of tool assembly/disassembly and reduce wear on piston and bore faces over many production cycles further reducing toolset cost by reducing frequency of maintenance and tool refurbishment. The piston components (21) are again split in half along the central plane parallel to the bore (25) axis. The piston (21) and bolster (20) are again machined from dissimilar materials with dissimilar coefficients of thermal expansion. Aluminium is used in the present invention for the piston components (21) and steel for the bolster component (20). However in the 16.5 degree self-releasing tool design there is a gap (29) between the base of the piston and base of the bore in the assembled tool (28). A cavity plate (22) also made from aluminium in the present invention forms the remainder of the surface of the weld cavity (27). The weld cavity (27) formed is designed in this instance to accept the assembly of parts as shown in FIG. 1 (1). A screw clamp (23) made from steel in the present invention is used to secure the piston components (21) and cavity plate (22) components in place at the weld temperature. An optional flange feature (30) in the piston components can be used to insert and extract the piston components (21) from the bolster bore more easily during assembly/disassembly of the tool further assisting productivity. The aluminium piston components (21) and cavity plate (22) grow in size more than the steel bolster (20) and top clamp (23) at the weld temperature leading to an interference fit between the components according to the present invention. The interference fit between the piston surface (24) and the bore surface (25) at the weld temperature prevents thermal expansion forces from the assembly of parts from opening the cavity split line (26) preventing leakage of liquid polymer from the weld cavity (27). The screw clamp (23) prevents the piston components (21) from sliding out of the bolster (20) due to thermal expansion at the weld temperature and further provides the thermal expansion mis-match to seal the split line between cavity plate (22) and piston components (21).

Unlike the piston/bore tool described in FIG. 2 and FIG. 3 the 16.5 degree self-releasing design ensures that the piston components will always be quick to assemble will self-release from the bolster during disassembly and the piston/bore surfaces will not wear leading which would lead to reduced tool life. The essential feature of the 16.5 degree self-releasing tool design namely a gap (29) at the base of piston and bore and corresponding cone angle of the piston/bore surfaces (24, 25) with respect to the bore axis ensures that the only features which must be machined to a critical tolerance are the piston and bore angle and the split line face flatness. This results in a tool design which is relatively economical to make in large numbers to overcome the cycle time challenges of the present invention.

EXAMPLES

The part assembly (1) shown in FIG. 1 was welded using the tool geometry shown in FIG. 4 and FIG. 5. The parts were manufacture from High Density Polyethylene (HDPE), with each part loaded with a different volume ratio of titanium dioxide to give each part different functional properties from its neighbour and achieve a graduation of functional properties in the welded assembly. In this example the functional property was permittivity. The parts were injection moulded using a Travin TP1 injection moulding machine prior to assembly. The parts were assembled by hand and positioned in the weld cavity (27) of one of the piston halves (21). The cavity plate (22) was then positioned and the second piston half positioned over the assembly of parts (1) so as to close the weld cavity (27) around the assembly of parts. Both piston components (21) and the cavity plate (22) were machined on a CNC lathe from aluminium 6082 T6. The piston assembly was then lowered into the bore of the bolster (20). The top clamp (23) was then screwed into the female thread on the bolster (20) and tightened to a torque of 10 N/m. Both bolster (20) and top clamp (23) were machined on a CNC lathe from EN24T steel. The assembled tool (28) was then placed in an oil heated platen press, with both platens pre-heated to a temperature of 140 degrees Celsius.

The throat between the platens was closed and the tool clamped between top and bottom platens using a pressure of 1 tonne; a pressure adequate only to ensure a good thermal contact between top and bottom surfaces of the tool and top and bottom platens. The tool remained in the platens for 30 minutes after which time it was removed and half submersed in a flat bottomed metal container containing 20 liters of tap water at 20 degrees Celsius.

The assembled tool (28) was allowed to cool for 6 minutes in this water bath after which time it was removed from the water and disassembled in the reverse order to the assembly described previously. The welded assembly (1) was removed from the weld cavity (27) and all parts were found to be fully bonded to one another but not to the weld cavity surfaces from which they had shrunk back from during cooling. Measurement of the diameter of the welded assembly at different angles showed the shaped article was concentric within a tolerance of +/−50 microns. The welded assembly was cut in half using a woodworking band saw and polished to the half diameter plane using a woodworking sanding wheel. The polished surface was then inspected using an optical scanner and the cross section geometry of the assembly laid over this image using CorelDraw 2D drawing software. The geometry was found to be within +/−200 microns of the nominal assembly geometry at all interfaces and the discrepancies seen were attributable to tolerances of the moulded parts forming the assembly of parts at the injection moulding stage prior to welding.

In one embodiment a technique is provided which allows for a particularly economical assembly of multi-layered and thick second complex shaped structures made from thermoplastics. The further design of the process involves putting all the polymer components into a tool with a weld cavity shape matched to the outer circumference of the assembly. The tool is then heated to the melting temperature of the polymer. Thermal expansion forces the polymer components against the weld cavity surface and the pressure leads to full surface bonds between all parts.

The challenge with thick section polymer parts is that the thermal conductivity of polymers is low and regardless of how quickly the tool can be heated and cooled it takes a significant time period for the temperature at the centre of the assembly of parts to reach that of the tool. This leads to long cycle times and a large number of tools being required to achieve high volume throughput (each tool must therefore be priced accordingly). The tool concepts to overcome these challenges can be difficult and expensive to machine, for example; a piston and bore with tight clearance tolerance can be expensive to machine, difficult to assemble quickly and prone to wear due to the small clearance tolerance required.

A further improved concept to overcome these issues is based on a cone angle between piston and bore and (in the case of 16.5 degree self-releasing design) a threaded cap. The cone angle provided as drawn in FIG. 2 to FIG. 5 leads to easy assembly/disassembly and reduced wear whilst still ensuring adequate weld cavity split line sealing to ensure no leakage of liquid polymer from the assembly of parts within the weld cavity during welding which is a requirement of the present invention to control geometry of the welded assembly. The number of weld tool features which must be machined to a tight tolerance are significantly reduced and all parts can be machined on a lathe. This ensures tools can be made at lower cost in volumes greater than 300, which makes the process extremely economical. As shown in FIG. 2 to FIG. 5 by way of cross section of tool assembly and exploded diagrams of the different tool parts for both: 16.5 degree self-releasing design (FIG. 4 and FIG. 5) 1.5 degree self-locking design (FIG. 2 & FIG. 3).

The person skilled in the art realizes that the present invention is by no means limited to the preferred embodiments described above. On the contrary, many modifications and variations are possible within the scope of the appended claims.

Additionally, variations to the disclosed embodiments can be understood and effectuated by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A method of forming a shaped article wherein said article comprises at least two parts which are bonded, the method comprising:

assembling at least two non bonded parts in a weld cavity of a tool to form an assembly of the at least two parts, wherein said weld cavity is adapted to receive the assembly of at least two parts in the form of the shaped article;

sealing the weld cavity of the tool;

melting the assembly of at least two parts to bond the at least two parts together to form the shaped article, wherein the shape of the weld cavity is matched to the outer circumference of the assembly of parts such that thermal expansion forces the polymer parts against the weld cavity surface and the pressure leads to full surface bonds between all parts, and wherein the tool forming the weld cavity comprises two halves forming a piston which fits into the bore of a bolster component and the plane of the split line between the two piston halves is parallel to the axis of the bore such that the pressure from the thermal expansion of the assembly of parts within the weld cavity is opposed by the surface of the bore preventing the weld cavity split line from opening and therefore preventing leakage of polymer from within the pressurised weld cavity volume, and wherein the two piston components are made from a dissimilar metal with higher coefficient of thermal expansion than the bolster component ensuring that at the welding temperature the piston is larger in diameter than the bore diameter of the bolster component leading to an interference fit which makes forces the weld cavity split line to close at the weld temperature but which still allows for a clearance gap between piston and bore at room temperature for the tool to be assembled and disassembled.

2. The method according to claim 1 wherein the piston and bore faces are angled relative to the axis of the bore at an angle of 1.5 degrees or greater resulting in a cone shaped piston and bore giving rise to a draft angle to make it easier to assemble and disassemble the tool and reduced tool wear.

3. The method according to claim 1 wherein there is a gap between the base of the piston components and the base of the bore when the tool is assembled such that only the piston split line face flatness and the angle of piston and bore faces relative to bore axis need be machined to a tight tolerance significantly reducing the cost of manufacturing the tool.

4. The method according to claim 1 wherein a cone angle of 16.5 degrees or greater of the piston and bore faces relative to the axis of the bore and a top cap threaded into the top of the bolster bore to ensure a self-releasing fit between piston and bore components to further aid assembly and disassembly and further reduce tool wear in a production environment.

5. The method according to claim 1 wherein the shaped article is cooled following bonding of the least two parts.

6. The method according to claim 1 wherein the weld cavity is scaled to be larger in volume compared with the assembly of the at least two parts at about 20° C.

7. The method according to claim 1 wherein the weld cavity is scaled to be larger in volume compared with the assembly of the at least two parts at 20° C. by about 0.5-6 vol %, or about 0.5-3 vol %, or about 1-2 vol %.

8. The method according to claim 1 wherein the at least two non bonded parts are assembled to form an interface between the at least two non bonded parts and following melting the bond is formed across the entire interface.

9. The method according to claim 1 wherein pressure is exerted on the at least two parts by the tool weld cavity during formation of the bonded shaped article.

10. The method according to claim 1 wherein the tool is provided in more than one part to enable access to the weld cavity and for the at least two non bonded parts to be assembled in the weld cavity and removed therefrom following formation of the bonded shaped article.

11. The method according to claim 1 wherein the at least two bonded parts each possess different material properties for example any one or more of different permittivity properties, density, magnetic permeability, conductivity, antimicrobial, catalytic, modulus or colour.

12. The method according to claim 1 wherein the at least two parts are thermoplastic.

13. The method according to claim 1 wherein the at least two parts are polymer which may comprise a filler material.

14. The method according to claim 1, wherein: the at least two parts are polymer which may comprise a filler material; and the polymer is selected from one or more or any combination of polyethylene (PE), polypropylene (PP), Acrylonitrile Butadiene Styrene (ABS), Polyoxymethylene (POM), Poly (methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly (lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU).

15. The method according to claim 1, wherein:

the at least two parts are polymer which may comprise a filler material; and the polymer is selected from polyethylene and the polyethylene is selected from LDPE, or MDPE, or LLDPE or HDPE.

16. The method according to claim 1, wherein:

the at least two parts are polymer which may comprise a filler material; and the amount of filler is 0.5 vol % to 60 vol % based on the volume of the filled polymer.

17. The method according to claim 1, wherein the at least two parts are in the form of layers.

18. The method according to claim 1 wherein at least one of the at least two parts possesses a doubly curved surface or an irregular shape.

19. The method according to claim 1 wherein the shaped article is a functional component.

20. The method according to claim 1 wherein the shaped article is selected from a radome, RF lens, Luneburg lens, retro-reflector, RF waveguide, RF filter, RF resonator, metamaterial structure, refraction structure, diffraction structure, scattering structure or forms a part thereof.

21. The method according to claim 1, wherein the shaped article is selected from an electronic or electromechanical sensor, actuator, solenoid, motor, acoustic sound dampening cladding and mounts, multi-material enclosure, power tool component, pharmaceutical components such as prosthetics, implants, drug delivery systems, applicators, catheters, or forms a part thereof.

22. The method according to claim 1, wherein the shaped article is an optical lens or an RF frequency lens.

* * * * *